United States Patent Office 3,057,770
Patented Oct. 9, 1962

3,057,770
METHOD FOR THE RECOVERY OF SPENT SULPHITE LIQUORS
Anders Erik Gustaf Björkman, Säffle, Sweden, assignor to Billeruds Aktiebolag, Säffle, Sweden, a company of Sweden
No Drawing. Filed Apr. 28, 1960, Ser. No. 25,223
Claims priority, application Sweden May 29, 1959
2 Claims. (Cl. 162—36)

This invention relates to a process for the recovery of spent liquor from the sulfite cooking of plant material with a soluble base. A flow diagram of the process is as follows:

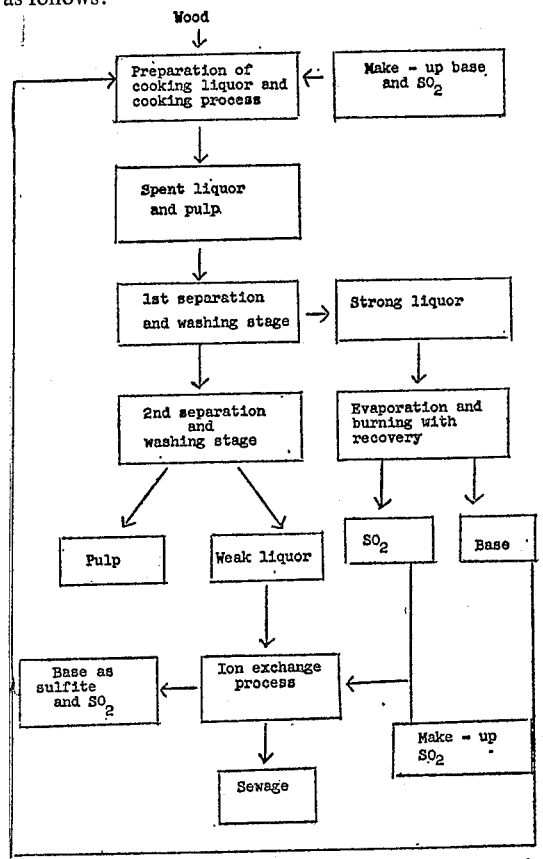

In the production of cellulose pulp by digesting plant material according to the so-called sulphite method, there is nowadays a certain tendency to abandon the acid calcium bisulphite for a sulphite of soluble bases, for instance ammonium and sodium. It is since many years common practice in sulphite mills to utilize the heat content of the spent liquor by combusting said liquor, usually after having been evaporated, in a conventional boiler, thus utilizing the heat content of the organic material of the liquor. Furthermore, when using liquors based upon sodium and magnesium, it is for economical reasons necessary also to recover the metal and the sulphur, to be used for the production of digestion liquor. A plurality of methods have been suggested.

The first and very important step when utilizing spent liquors is the separation of pulp and liquor. Various methods are used for carrying out this step on a technical scale, for instance displacing the liquor from the pulp by means of water, pressing off the liquor from the pulp, and washing the pulp on a filter. Two or more methods are often used in combination. If obtaining a high yield of solids from the liquor, it is necessary to use water as displacement and washing liquid, resulting in a dilution of the original liquor. The more the liquor is diluted, the higher is the quantity of heat necessary for evaporating the liquor before it is combusted. Therefore, the recovery of liquor must stop before the last quantity of solids recovered necessitates for the evaporation such an increased demand for steam as is greater than the quantity of heat utilized from said quantity of solids.

When recovering spent sulphite liquors based upon calcium, the yield ($U$) of solids is usually about 80–90%, and the concentration ratio ($f$) of the amount of solids in the recovered spent liquor to the amount of solids in the original spent liquor is usually about 0.8–0.9. In this case no chemicals are recovered, and the only useful product is the heat utilized from the combustion of the solids. When using soluble bases there are two additional ingredients which can be recovered, viz. the base and the sulphur content of the liquor, the base being the most valuable one. Therefore, it is in the latter case well-grounded from economical reasons to aim at a value of "$U$" of 94–98% in the recovery of the liquor, but a value of "$f$" of 0.70–0.85 can be accepted.

Of course it is possible to improve the values of "$U$" and "$f$" by means of a so-called recycling of the liquor. In the sulphite cooking process, however, such a re-cycling may cause a certain instability in the cooking liquor and an impaired result of the digestion. At high values of "$U$" there exists the risk that certain salts, for instance chlorides, concentrate during the recovery cycle to a harmful amount. Thus, even small amounts of chlorides may cause an increased corrosion on so-called stainless materials.

The present invention indicates a method, when using soluble bases, to combine a recovery of the solids of the liquor at a moderate yield with a nearly complete recovery of the base. The recovery of the liquor is continued in a first operation for such a time only, that the concentration ratio remains high, for instance not below 0.85. This first operation can be carried out in one or more steps. When calculating the optimum values of "$U$" and "$f$" the content of heat and sulphur only of the solids is taken into consideration. The spent liquor thus recovered is evaporated and treated for the recovery of chemicals and heat, in accordance to a method suitable for the particular base and digestion process.

The recovery is finished in a second operation, by displacing the liquor in the pulp with water, thus forming a diluted liquor, and passing said diluted liquor through a cation exchanger which absorbs the base while the remaining solids of the liquor is wasted. It is possible, by means of a cation exchanger, to recover the base from highly diluted liquors, and therefore the base can be recovered from the spent liquor almost completely.

When using a so-called weak cation exchanger the base may be eluted from the ion exchanger by $SO_2$-water. Because the ion exchanger contains 10–20% only of the total base content of the cooking liquor, the quantity of $SO_2$ necessary for said elution is not very great, and the elution is no problem though sulphurous acid is no strong acid. Possibly, the ion exchanger must now and then be "washed" with a strong acid, for instance dilute sulphuric acid, for the removal of multi-valent ions, for instance iron and chromium, because otherwise such ions are accumulated and impair the capacity of the ion exchanger.

Strong ion exchangers may also be used for this purpose, but in this case a strong acid must be used for the elution. For instance, it is possible to use sulphuric acid, and in this case it is possible to recover the cooking base as bisulphate or sulphate or by neutralization with a base, recovered by another method, in alkaline form. The sulphate form of a base is not totally inactive in the acid sulphite cooking process, because bisulphite (and bisulphate) is formed on the reaction of sulphate with sulphurous acid. It is also possible to regenerate the ion exchanger with a mixture of sulphuric acid and sulphurous acid under pressure.

What is claimed is:

1. A method for the recovery of spent liquor from the sulfite cooking of plant material with a soluble base which comprises separating spent liquor from the pulp in two stages, interrupting the separation of liquor from pulp in the first stage when the yield of solids in the separated liquor is economically optimum with respect to the content of heat and sulfur therein as compared with the heat necessary for the evaporation of the separated liquor, evaporating the separated liquor and burning the resulting solids concentrate, separating the remaining liquor from the pulp in the second stage by displacing said liquor with water thereby producing a diluted liquor and treating said diluted liquor with a cation exchange material to recover the soluble base therefrom.

2. A method as defined in claim 1 in which the cation exchanger is a hydrogen saturated cation exchanger and in which the soluble base is recovered from said cation exchanger and it is regenerated by treatment with sulfurous acid.

References Cited in the file of this patent

UNITED STATES PATENTS

| | | |
|---|---|---|
| 2,195,378 | Dunbar | May 26, 1940 |
| 2,392,435 | Tyler | Jan. 8, 1946 |
| 2,736,635 | Haywood | Feb. 28, 1956 |
| 2,778,714 | Kasper | Jan. 22, 1957 |
| 2,916,355 | Swenson | Dec. 8, 1959 |
| 2,930,106 | Wrotnowski | Mar. 29, 1960 |

OTHER REFERENCES

Paper Industry & Paper World, May 1943, pages 186, 162–30.